US006655727B2

United States Patent
Hill et al.

(12) United States Patent
(10) Patent No.: US 6,655,727 B2
(45) Date of Patent: Dec. 2, 2003

(54) AIR CONDUCTION DEVICE FOR A MOTOR VEHICLE

(75) Inventors: Jason Hill, Long Beach, CA (US); Roland Heiler, Laguna Niguel, CA (US); Maxel Szwaj, Birmingham, MI (US)

(73) Assignee: Dr. Ing. h.c.F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 09/964,886

(22) Filed: Sep. 28, 2001

(65) Prior Publication Data

US 2002/0041103 A1 Apr. 11, 2002

(30) Foreign Application Priority Data

Sep. 28, 2000 (DE) .......................................... 100 48 122

(51) Int. Cl.[7] .............................................. B62D 35/00
(52) U.S. Cl. .............................. 296/180.5; 296/180.1; 180/903
(58) Field of Search ........................ 296/180.1, 180.5, 296/180.3; 180/903

(56) References Cited

U.S. PATENT DOCUMENTS

| | | | | |
|---|---|---|---|---|
| 4,671,555 A | * | 6/1987 | Linz et al. ............... | 296/180.5 |
| 4,773,692 A | * | 9/1988 | Schleicher et al. ...... | 296/180.5 |
| 5,522,637 A | * | 6/1996 | Spears ..................... | 296/180.3 |
| 5,923,245 A | * | 7/1999 | Klatt et al. .............. | 296/180.1 |
| 6,030,028 A | * | 2/2000 | Radmanic et al. ....... | 296/180.5 |
| 6,170,904 B1 | | 1/2001 | Schaedlich et al. | |
| 6,382,708 B1 | * | 5/2002 | Erdelitsch et al. ....... | 296/180.5 |
| 2001/0052717 A1 | * | 12/2001 | Yoon ....................... | 296/180.1 |

FOREIGN PATENT DOCUMENTS

| | | | | |
|---|---|---|---|---|
| DE | 19741321 | | 12/1998 | |
| JP | 60-234075 | * | 5/1984 | ............. 296/180.5 |
| JP | 60-146747 | * | 8/1985 | ............. 296/180.5 |
| JP | 2-6281 | * | 1/1990 | ............. 296/180.5 |

OTHER PUBLICATIONS

Porsche 911 turbo, Porsche Service Information Technik 1996.

* cited by examiner

Primary Examiner—Stephen T. Gordon
Assistant Examiner—Hilary Gutman
(74) Attorney, Agent, or Firm—Crowell & Moring LLP

(57) ABSTRACT

An air conduction device suitable for a sports car motor vehicle extends in a lateral direction of the vehicle, adjacent to a tail lid. The air conduction device can be moved by an activation device out of a resting position into an operating position and vice versa. In order to optimize the air conduction device in functional and structural terms, it is hinged on the tail lid by a swing arm device which is separably connected with the activation device by means of which the air conduction device is moved out of the resting position into the operating position.

28 Claims, 4 Drawing Sheets

A-A

AIR CONDUCTION DEVICE FOR A MOTOR VEHICLE

BACKGROUND AND SUMMARY OF THE INVENTION

This invention relates to an air conduction device for a motor vehicle, in particular, a sports car. Preferred embodiments of the invention relate to an air conduction device for a sports car motor vehicle that extends in a lateral direction of the vehicle, adjacent to a tail lid and that can be moved by an activation device out of a resting position into an operating position and vice versa.

A known air conduction device of the kind mentioned initially, according to DE—Porsche Service Information '96 (corresponding to the Porsche 911 Turbo vehicle) is firmly arranged in the rear vehicle area of a sports car on a tail lid. The aerodynamic properties of the sports car can be optimized with the help of the design of the air conduction device but, in particular, one can also reduce the lift on the rear axle.

An improved air conduction device described in German Patent Document DE 197 41 321 A1 (corresponding U.S. Pat. No. 6,170,904), comprises a tail wing that can be moved out of a retracted resting position into an extended operating position and vice versa. To activate the tail wing, one uses a drive device that has two telescoping extenders arranged at an interval from each other in the lateral direction of the vehicle. The telescoping extenders engage the underside of the tail wing that runs adjacent to a swingable tail hood.

An object of the invention is to so design an adjustable air conduction device for a motor vehicle in the area of a tail lid that—with good aerodynamic and kinetic function—it can easily be integrated in structural terms into adjoining mold structures of a superstructure.

This object is achieved according to preferred embodiments of the invention by providing an air conduction device for a sports car motor vehicle that extends in a lateral direction of the vehicle, adjacent to a tail lid and that can be moved by an activation device out of a resting position into an operating position and vice versa, wherein the air conduction device is hinged by a swing arm device on the tail lid which is separably connected with the activation device and operable to move the air conduction device out of a resting position into an operating position.

Other advantageous features of preferred embodiments of the invention are described herein and in the claims.

Principal advantages to be derived from features of preferred embodiments of the invention include the following. The air conduction device is integrated into the superstructure in a spatially favorable manner and contributes to the aerodynamic optimization of the motor vehicle. Moreover, the hinging of the air conduction device on the tail lid according to advantageous features of certain embodiments creates good prerequisites for moving the latter, on the one hand, into various positions and, on the other hand, attaching it to the activation device. The tail lid and the air conduction device can be combined into a prefabricated module according to advantageous features of certain preferred embodiments. The string element of the swing arm device ensures that the air conduction device will cooperate with a specific tension with the activation device or the activation rods according to advantageous features of certain preferred embodiments. The adjusting device, which is connected with the activation rod assembly, can be of a hydraulic, pneumatic, or electrical kind according to advantageous features of certain preferred embodiments. Finally, a locking device is provided between the tail lid and the swing arms of the swing arm device according to advantageous features of certain preferred embodiments. That last-mentioned locking device keeps the air conduction device in the resting position as a result of which the air conduction device is fixed in the resting position during actual driving.

Other objects, advantages and novel features of the present invention will become apparent from the following detailed description of the invention when considered in conjunction with the accompanying drawings.

DETAILED DESCRIPTION OF THE DRAWINGS

Figure 1:
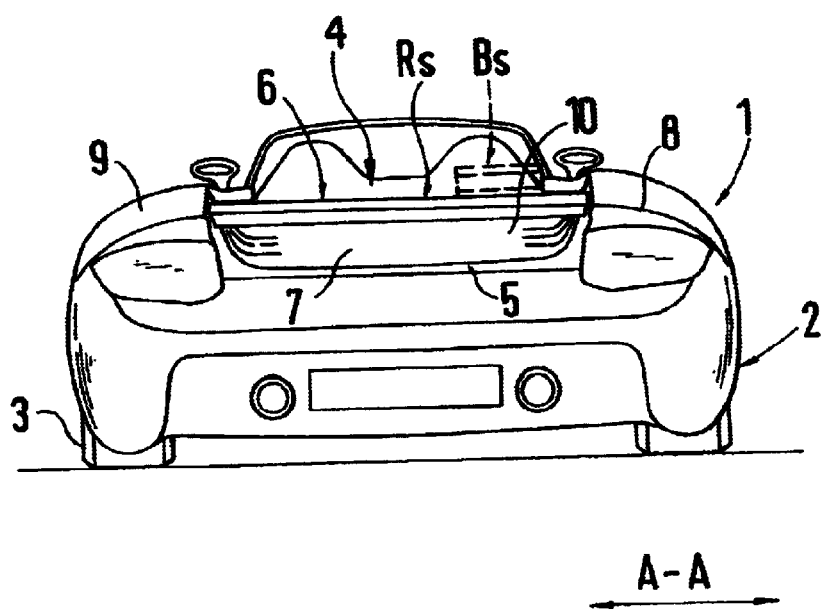
FIG. 1 is a rear view of a motor vehicle with an air conduction device constructed according to preferred embodiments of the invention.

A motor vehicle, made as a two seat sports car 1, comprises a superstructure 2, that is supported by wheels 3 and that, in a terminal area 4, near the tail end, has a tail lid 5 and an air conduction device 6. Air conduction device 6 is used for the aerodynamic optimization of the sports car 1 and extends above an outer wall 7 of the tail lid 5 in the lateral vehicle direction A—A and is limited by side parts 8, 9, in such a way that the air conduction device 6, at least in some areas, is aligned in a surface-flush manner with respect to the side parts 8, 9. Moreover, outer wall 7 of tail lid 5 and the air conduction device 6 form a through flow duct 10 when the tail lid 5 is closed and the air conduction device 6 is in an operating position Bs.

In order to use the aerodynamic effect of air conduction device 6 in a specifically targeted manner, it is so fashioned that it can be moved out of a resting position Rs into an operating position Bs and vice versa. For this purpose, there is provided an activation device 11 that cooperates with a swing arm device 12 in a separable manner. Via the swing arm device 12, air conduction device 6 is hinged upon a first side 13 of the swing arm device by means of a hinge 14 upon tail lid 5 whereas swing arm device 12 is supported on a second side 15 on activation device 11.

Activation device 11 comprises an activation rod assembly 16 upon which rests a support segment 17 of the swing arm device 12, specifically, in a separable manner. By separable manner it is meant that the support segment 17 abuts against but is not fixed to, the activation rod assembly 16. A spring element 18 engages swing arm device 12, acting to bias the mentioned swing arm device 12 against activation rod assembly 16 and to clamp it or to bias the air conduction device into the resting position Rs. Spring element 18 is a leg spring 19 that is arranged in the area of hinge 14 and that is supported with a first spring arm 20 upon a tail lid segment 21 and with a second spring arm 20' upon swing arm device 12.

The activation rod assembly 16 is part of an adjustment device 22 that can be of a hydraulic, pneumatic, or electrical kind. In the exemplary embodiment shown, the activation rod assembly 16 is a piston rod of a cylinder piston unit 23 that is arranged upright in sports car 1 and that is kept in position via a console 24 on the superstructure 2. To move air conduction device 6 out of the resting position Rs into the operating position Bs, and vice versa, activation rod assembly 16 performs lifting motions in direction B—B. Swing arm device 12 of air conduction device 6 comprises two swing arms 25, 26 which run on both sides of a longitudinal midplane C—C of sports car 1 and which are arranged outside of longitudinal walls 27, 28 on tail lid 5. Each swing arm, for example, 25, on one free end 29, has a carrying segment 30 for a conduction element 40 of the air conduction device 6 that extends at a spacing from the rear of tail lid 5.

Figure 2:
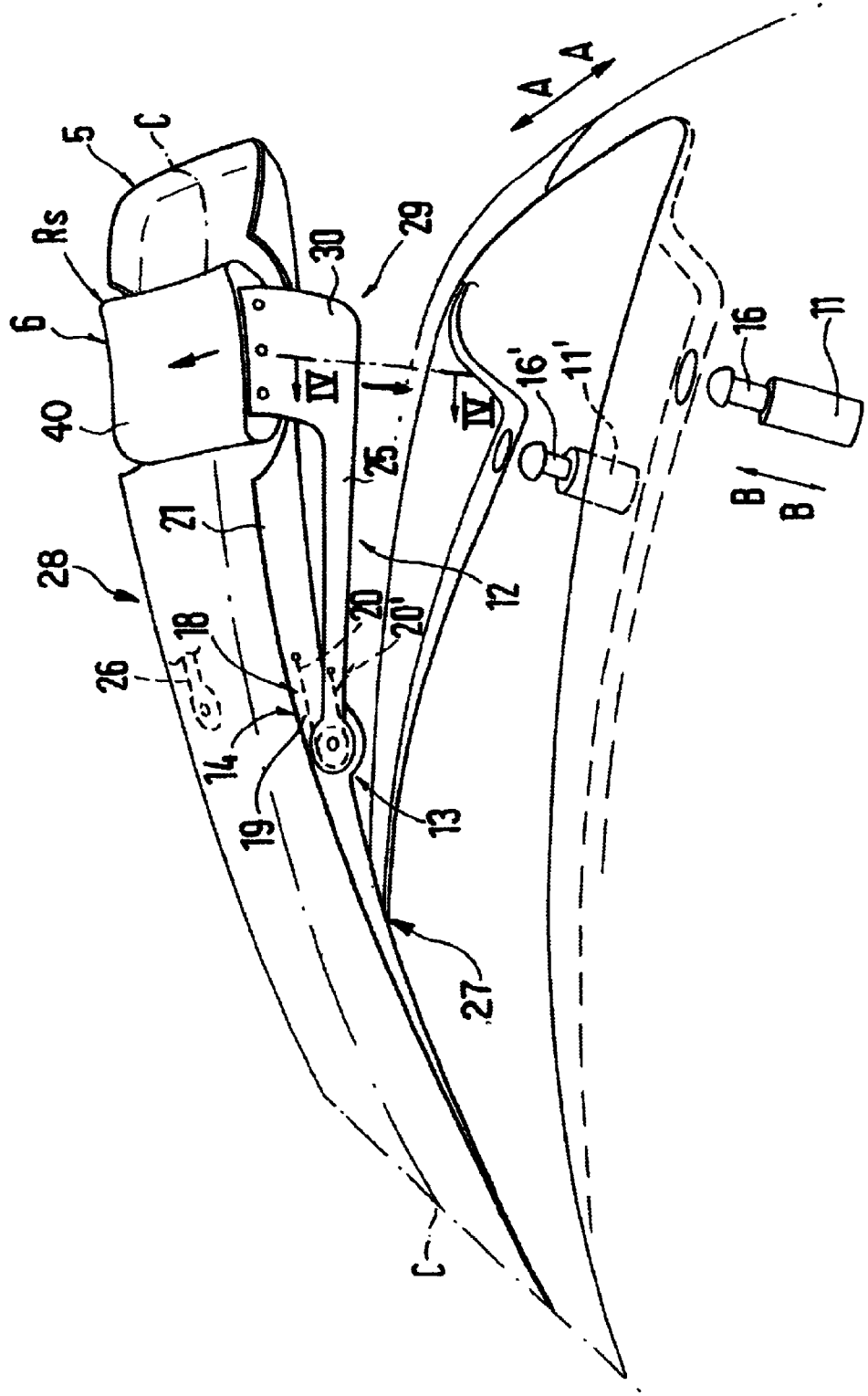
FIG. 2 is a diagram presenting an oblique view from above and a longitudinal side of the motor vehicle upon a tail lid with an air conduction device constructed in accordance with preferred embodiments of the invention and with the tail lid shown in open position to facilitate showing of the structure.
Figure 3:
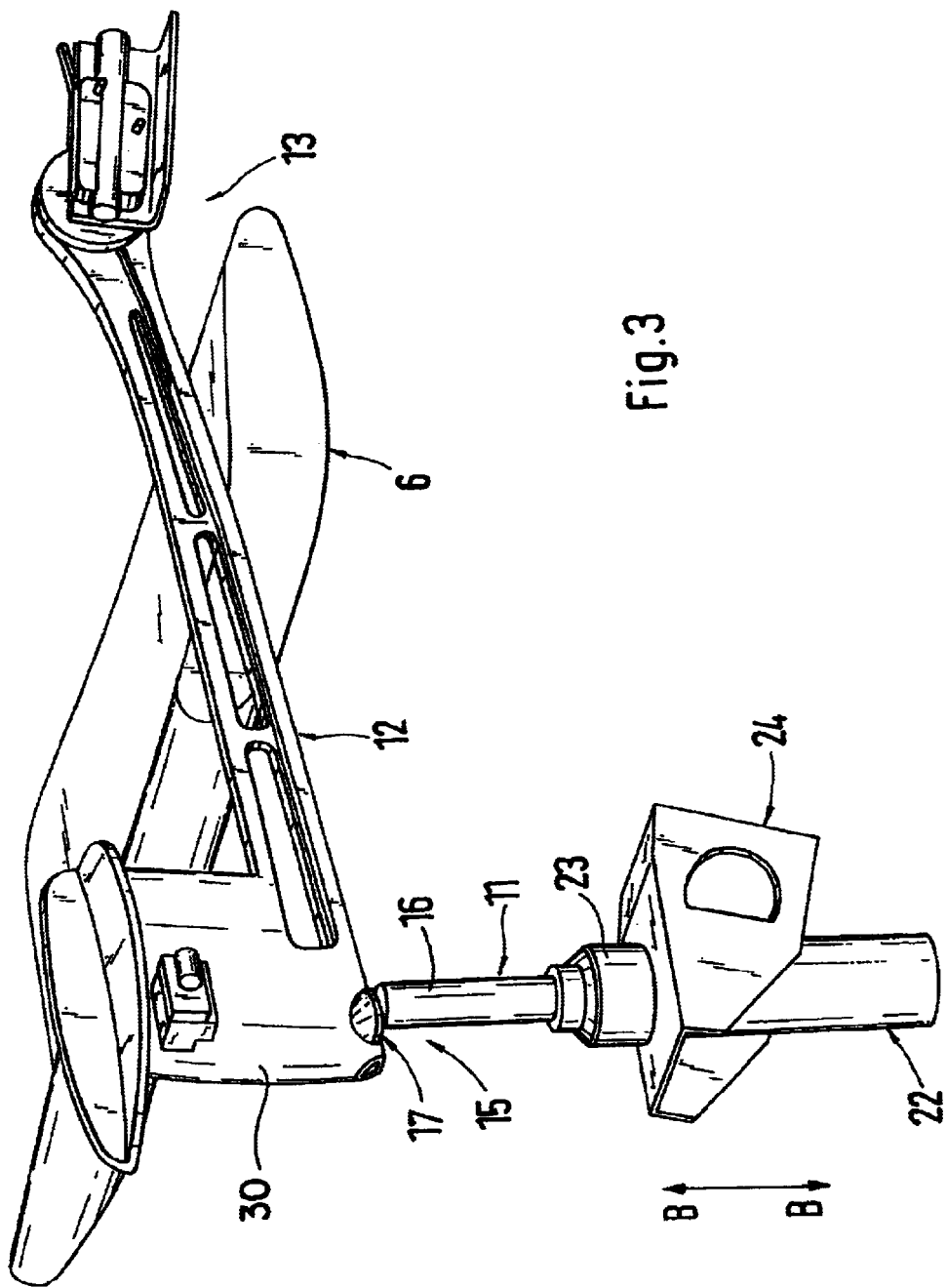
FIG. 3 is an oblique view from the rear and the right showing details of the air conduction device of FIG. 2.
Figure 4:
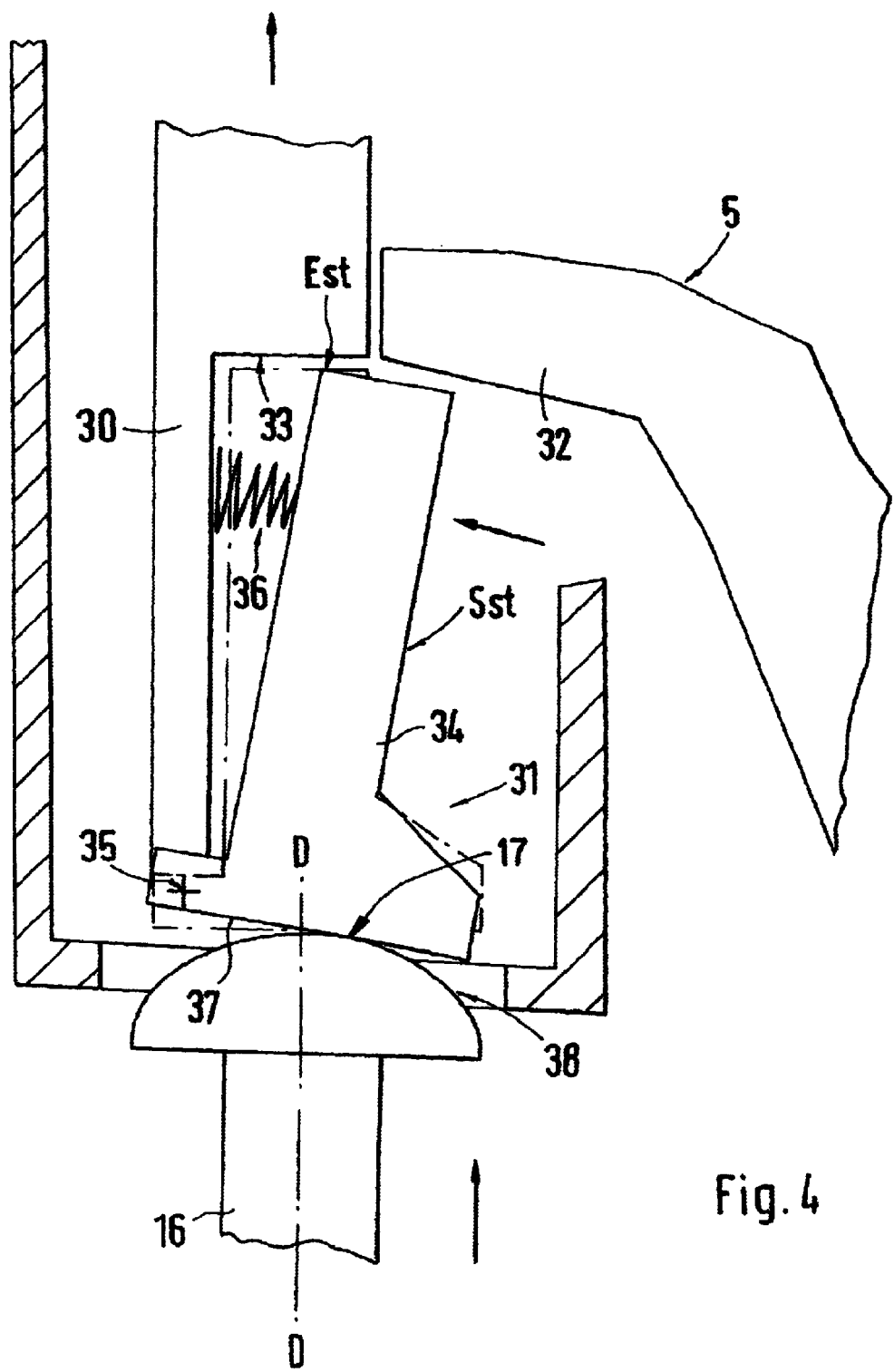
FIG. 4 is a profile along line IV—IV in FIG. 2, shown on a larger scale.

The FIG. 2 illustration shows the assembly with the lid 5 in an open position and with schematic depiction of both the above described activation device assembly 11, 16 of the lid 5 and a corresponding similar actuation device assembly 11', 16' at the opposite lateral side of lid 5.

A locking device 31 is provided so that, when air conduction device 6 is in the resting position Rs, the relative motions such as lateral and fore and aft vibrations and movements between it and the tail lid 5 can be avoided; this locking device works between a first wall segment 32 of tail lid 5 and a second wall segment 33 of carrying segment 30. Locking device 31 has a locking handle 34 that, when air conduction device 6 is in the resting position Rs, fixes both wall segments 32 and 33. For this purpose, the locking handle 34 is positioned on carrying segment 30 of swing arm 25 by means of a swing axis 35, while a spring 36 seeks to rotate the locking handle 34 into a locking position Sst.

In locking position Sst, locking handle 34 grasps under wall segments 32, 33. Locking handle 34, with a contact surface 37, lies on a support surface 38 of activation rod assembly 16.

Swing axis 35 of locking handle 34 lies outside the longitudinal midplane D—D, so that—due to the lifting motion of activation rod assembly 16—the locking handle is moved out of the locking position Sst into an unlocking position Est.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Air conduction device for a sports car that extends in a lateral direction of the sports car, adjacent to a tail lid and that can be moved by an activation device out of a resting position into an operating position,
   wherein the air conduction device is hinged by a swing arm device on the tail lid, and wherein said swing arm device is separably connected with the activation device and operable to move the air conduction device out of the resting position into the operating position.
2. Air conduction device according to claim 1,
   wherein the swing arm device is hinged on a first side by a hinge connected to the tail lid and is supported on a second side by the activation device.
3. Air conduction device according to claim 1,
   wherein the activation device comprises an activation rod assembly upon which rests a support segment of the swing arm device in a separable manner.
4. Air conduction device according to claim 2,
   wherein the activation device comprises an activation rod assembly upon which rests a support segment of the swing arm device in a separable manner.
5. Air conduction device according to claim 3,
   wherein a spring element acts on the swing arm device, which said spring element seeks to tense the swing arm device towards the activation rod assembly.
6. Air conduction device according to claim 4,
   wherein a spring element acts on the swing arm device, which said spring element seeks to tense the swing arm device towards the activation rod assembly.
7. Air conduction device according to claim 5,
   wherein the spring element is a leg spring that is arranged in an area of the hinge and is supported with a first spring arm upon a tail lid segment and with a second spring arm upon the swing arm device.
8. Air conduction device according to claim 6,
   wherein the spring element is a leg spring that is arranged in an area of the hinge and is supported with a first spring arm upon a tail lid segment and with a second spring arm upon the swing arm device.
9. Air conduction device according to claim 3,
   wherein the activation rod assembly cooperates with an adjusting device of one of a hydraulic, pneumatic, or electrical design.
10. Air conduction device according to claim 9,
    wherein the activation rod assembly of the adjusting device is a piston rod of a cylinder piston unit.
11. Air conduction device according to claim 10,
    wherein the cylinder piston unit is arranged in an upright standing manner and is kept in position by a console on a vehicle superstructure.
12. Air conduction device according to claim 1,
    wherein the swing arm device of the air conduction device comprises respective swing arms which are arranged on both sides of a longitudinal midplane of the sports car.
13. Air conduction device according to claim 1,
    wherein the swing arm device, at a free end, has a carrying segment for a conduction element of the air conduction device that is made in a manner of a wing and that runs above the tail lid.
14. Air conduction device according to claim 12,
    wherein the swing arms, at free ends, have carrying segments for a conduction element of the air conduction device that is made in a manner of a wing and that runs above the tail lid.
15. Air conduction device according to claim 13,
    wherein a locking device is arranged between the tail lid and said carrying segment of the swing arm device, said locking device holding the air conduction device in the resting position.
16. Air conduction device according to claim 14,
    wherein a locking device is arranged between the tail lid and said carrying segment of the swing arm device, said locking device holds the air conduction device in the resting position.
17. Air conduction device according to claim 15,
    wherein the locking device comprises a locking handle that is loaded by a spring, said handle being movable via an activation rod assembly out of a locking position into an unlocking position.
18. Air conduction device according to claim 17,
    wherein the locking handle is arranged in a swingable manner on said carrying segment of the swing arm device.

19. An air conduction assembly which in use is disposed on a motor vehicle with a lid movable between open and closed positions, said air conduction assembly comprising:

an air flow deflecting member disposable above the lid, a swing arm which in use is supported at a pivot axle at a lateral side of the lid, a swing arm support assembly connected with the air flow deflecting member at a position spaced from the pivot axle, a spring operable to bias the swing arm to hold the air flow deflecting member in a rest position, and an activation device operable to selectively pivot the swing arm against the spring to thereby lift the air flow deflecting member above the lid to form an air deflector with flow of air above and below the air flow deflecting member.

20. An assembly according to claim 19, wherein the activation device includes a movable piston abuttingly engageable with a downward facing surface of an air flow deflecting member support part.

21. An assembly according to claim 19, wherein a locking assembly carried by the lid is provided for locking the flow deflecting member in the rest position.

22. An assembly according to claim 21, wherein said locking assembly is operable to release the flow deflecting member when acted on by the activation device.

23. An assembly according to claim 20, wherein a locking assembly carried by the lid is provided for locking the flow deflecting member in the rest position.

24. An assembly according to claim 23, wherein said locking assembly is operable to release the flow deflecting member when acted on by the activation device.

25. A motor vehicle comprising:

a rear lid movable between an open and a closed position, and an air flow deflecting member carried by the lid and selectively moveable between a lower rest position and an upper operation position, wherein said air flow deflecting member is supported by at least one swing arm pivotally mounted at the lid, and wherein an activation device is supported at a vehicle superstructure and includes a moveable member abuttingly engaging under the swing arm to selectively lift the swing arm and the air flow deflecting member.

26. A motor vehicle according to claim 25, wherein a spring is provided at the lid for biasing the air flow deflecting member to the rest position.

27. A motor vehicle according to claim 26, wherein a locking assembly carried by the lid is provided for locking the flow deflecting member in the rest position.

28. An motor vehicle according to claim 27, wherein said locking assembly is operable to release the flow deflecting member when acted on by the actuation device.

* * * * *